J. R. AYOTTE.
STORM PROTECTOR FOR WINDSHIELDS OF AUTOMOBILES.
APPLICATION FILED JAN. 31, 1921.
1,418,121.
Patented May 30, 1922.
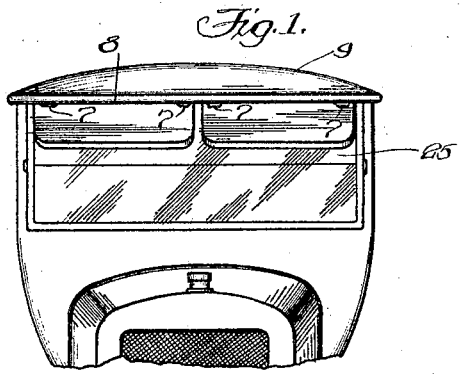
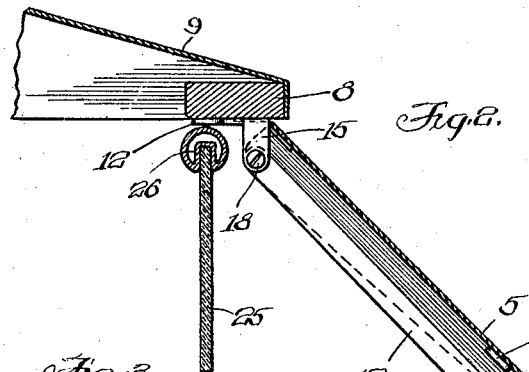
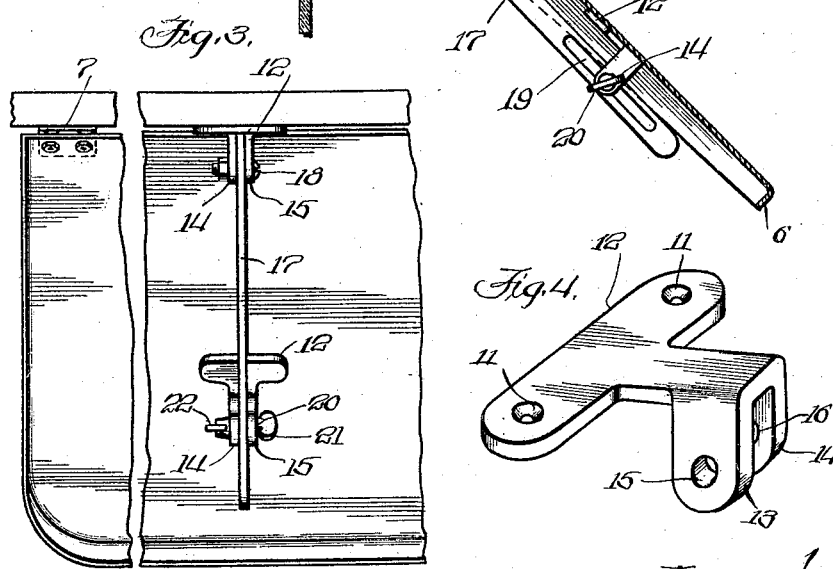
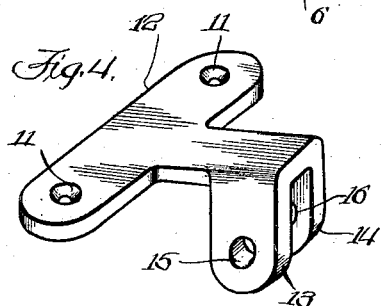
Inventor:
Joseph René Ayotte

UNITED STATES PATENT OFFICE.

JOSEPH RENÉ AYOTTE, OF CHICAGO, ILLINOIS.

STORM PROTECTOR FOR WINDSHIELDS OF AUTOMOBILES.

1,418,121. Specification of Letters Patent. Patented May 30, 1922.

Application filed January 31, 1921. Serial No. 441,154.

*To all whom it may concern:*

Be it known that I, JOSEPH RENÉ AYOTTE, a subject of the King of Great Britain, residing at Chicago, in the county of Cook and State of Illinois, have invented certain new and useful Improvements in Storm Protectors for Windshields of Automobiles, of which the following is a specification.

The invention relates to improvements in storm protectors for wind shields of automobiles.

One of the objects of the invention is to provide a protector for windshields which is adjustable for use by a convenient accessible means and which may be adjustably removed entirely from the field of observation through the shield, when not needed.

In driving an automobile, it is necessary for the driver to be able at all times to see through the windshield to enable him to select his path and to avoid collisions. In stormy weather, rain, snow and sleet will accumulate on the windshield to such an extent as to render the glass of the windshield practically opaque, rendering the driver's task extremely hazardous. Many attempts have heretofore been made to clean the glass by use of squeegees and the like, but such devices are not always effectual and require frequent attention for their necessary operation.

The present invention serves as a protector for the windshield to prevent deposit of objectionable matter thereon and at the same time it does not materially obscure the vision of the operator.

The protector is in the form of a vizor or adjustable roof that may be maintained at any suitable angle before the upper glass of the shield and interposed between the shield and the precipitation from the clouds above, without materially interfering with the view of the operator into a field of vision along the roadway.

Another object is to provide a sturdy, inexpensive, efficient device that may quickly be secured in place on any standard automobile and which improves the appearance of the vehicle.

Another object is to provide simple, inexpensive and effective fittings wherewith to adjust the protector.

Other, further and more specific objects of the invention will become readily apparent, to persons skilled in the art, from a consideration of the following description, when taken in conjunction with the accompanying drawings, wherein:—

Fig. 1 is a front view of a portion of a standard automobile showing a pair of shield protectors in place before the shield.

Fig. 2 is an enlarged transverse section through one of the protectors and part of the vehicle top.

Fig. 3 is a bottom plan view.

Fig. 4 is a bracket, of which there is a pair, one attached to the top and one to the shield.

In all the views the same reference characters are employed to indicate similar parts.

There may be a pair of protectors used on a car, as shown in Fig. 1, but one only is essentially necessary to insure safety; the one in front of the driver and, as they are alike in all respects, I shall specifically describe only one.

The shield consists of a plate 5, of suitable material, to extend about one-half way across the windshield. The plate may be enameled sheet metal having a flange 6 at its front longitudinal edge and at each end to stiffen the plate and add to its appearance. Hinges 7 may be secured to the upper edge of the plate by spot welding, rivets or otherwise. The other member of the hinge is to be secured to the cross bar 8 of the vehicle top 9.

A bracket 12, shown in Fig. 4, is connected to the bar 8 about mid-way of the linear dimensions of the shield by screws that pass through the holes 11—11 that are made through the cross bar 9. The bracket has two parallel upstanding arms 13 and 14 having holes 15 and 16 to receive a pin that passes through these holes and pivots the bar 17 therein, as at 18.

Another bracket is secured to the plate 5 near the bottom edge thereof by spot welding, screws or the like, to receive the bar 17. The bar 17 is slotted, as at 19, and a threaded bolt 20, having a head 21 passes through the holes 15 and 16 and through the slot 19 in the bar 17. A wing nut 22 is threaded on the other end of the bolt 20 and clamps the arms 13 and 14 into frictional engagement with the bar 17 to hold the protector in adjusted positions.

It is apparent that when the shield is raised and lowered that the arms 13 and 14 will slide along the bar and that the nut 22 may be turned to hold the protector in adjusted position.

The upper glass 25 of the windshield is held in the frame 26 as usual in standard cars.

Having described my invention what I claim as new and desire to secure by Letters Patent, is:—

A windshield protector for automobiles, comprising a plate hinged at its top edge to the front cross bar of the automobile top; a bracket attached to said bar; a similar bracket attached to the underside near the lower edge of the plate; a rod pivoted in the upper bracket and slidable in the lower bracket and means to prevent the sliding engagement of the lower bracket and rod to hold the plate in adjusted inclined position.

In testimony whereof I hereunto subscribe my name.

JOSEPH RENÉ AYOTTE.